(12) United States Patent
Rode

(10) Patent No.: US 8,359,936 B2
(45) Date of Patent: Jan. 29, 2013

(54) SYSTEMS AND METHODS FOR MEASURING BEARING ENDPLAY

(76) Inventor: John E. Rode, Fonda, NY (US)

( * ) Notice: Subject to any disclaimer, the term of this patent is extended or adjusted under 35 U.S.C. 154(b) by 0 days.

(21) Appl. No.: 13/091,890

(22) Filed: Apr. 21, 2011

(65) Prior Publication Data

US 2012/0079893 A1 Apr. 5, 2012

Related U.S. Application Data

(60) Provisional application No. 61/388,806, filed on Oct. 1, 2010.

(51) Int. Cl.
G01L 5/12 (2006.01)
G01N 19/00 (2006.01)
G01B 1/00 (2006.01)
(52) U.S. Cl. .............. 73/862.49; 73/865.9; 33/517
(58) Field of Classification Search .......... 73/862.23, 73/865.9; 33/517; 29/898.09
See application file for complete search history.

(56) References Cited

U.S. PATENT DOCUMENTS

| 518,328 A | 4/1894 | Oakey |
| 578,576 A | 3/1897 | Strauss et al. |
| 1,352,643 A | 9/1920 | Young |
| 1,366,273 A | 1/1921 | Nettlefold |
| 1,373,489 A | 4/1921 | Cochran |
| 1,384,655 A | 7/1921 | Allmon |
| 1,440,938 A | 1/1923 | Sieroslawski |
| 1,755,807 A | 4/1930 | Boles |
| 1,758,515 A | 5/1930 | Heiermann |
| 2,301,786 A | 11/1942 | Millermaster |
| 2,426,219 A | 8/1947 | Jackson |
| 2,521,966 A * | 9/1950 | Clayborne ............ 33/501.02 |
| 2,755,698 A | 7/1956 | Wurzel |
| 2,769,360 A | 11/1956 | Woodford et al. |

(Continued)

FOREIGN PATENT DOCUMENTS

| DE | 3905385 | 8/1990 |
| EP | 1367299 A2 | 12/2003 |

(Continued)

OTHER PUBLICATIONS

Mar. 22, 2007 Search Report in related Application No. GB 0701360.0.

(Continued)

*Primary Examiner* — Lisa Caputo
*Assistant Examiner* — Jonathan Dunlap
(74) *Attorney, Agent, or Firm* — Heslin Rothenberg Farley & Mesiti P.C.; Victor A. Cardona, Esq.

(57) ABSTRACT

A system for use in measuring an end play of a wheel hub assembly includes a follower configured to extend through an opening in a cover connected to a wheel hub. The cover covers the wheel hub such that the cover inhibits access to an end of a shaft of the wheel hub assembly, and the follower is configured to contact the end through the opening. The follower is received in a holder engageable with the cover such that the follower is movable relative to the cover and the holder to allow the follower to extend from the holder to contact the end of the shaft. A frame has a cavity receiving a measurement probe extending outwardly from the cavity. The probe contacts the follower and is configured to measure movement of the follower to determine endplay of the bearing assembly on the shaft. The frame includes a plurality of legs extending from the frame to a hub mounted on the shaft and coupled to the bearing to support the frame relative to the hub.

23 Claims, 4 Drawing Sheets

U.S. PATENT DOCUMENTS

| | | | |
|---|---|---|---|
| 2,813,732 A | 11/1957 | Hird | |
| 3,144,909 A | 8/1964 | Hart et al. | |
| 3,241,409 A | 3/1966 | Raptis | |
| 3,464,474 A | 9/1969 | Jansen | |
| 3,480,300 A | 11/1969 | Jeffery et al. | |
| 3,581,609 A | 6/1971 | Greenwood | |
| 3,664,226 A | 5/1972 | Gonzalez | |
| 3,678,981 A | 7/1972 | Heyworth | |
| 3,742,568 A | 7/1973 | Hahlbeck | |
| 3,762,455 A | 10/1973 | Anderson, Jr. | |
| 3,844,323 A | 10/1974 | Anderson, Jr. | |
| 3,986,750 A | 10/1976 | Trent et al. | |
| 4,048,897 A | 9/1977 | Price, Jr. | |
| 4,054,999 A | 10/1977 | Harbottle | |
| 4,210,372 A | 7/1980 | McGee | |
| 4,305,438 A | 12/1981 | Spinosa et al. | |
| 4,812,094 A | 3/1989 | Grube | |
| 4,958,941 A | 9/1990 | Imanari | |
| 4,971,501 A | 11/1990 | Chavez | |
| 5,011,306 A | 4/1991 | Martinie | |
| 5,058,424 A | 10/1991 | O'Hara | |
| 5,070,621 A | 12/1991 | Butler et al. | |
| 5,129,156 A | 7/1992 | Walker | |
| 5,180,265 A | 1/1993 | Wiese | |
| 5,348,349 A | 9/1994 | Sloane | |
| 5,362,111 A | 11/1994 | Harbin | |
| 5,366,300 A | 11/1994 | Deane | |
| 5,490,432 A * | 2/1996 | Allard et al. | 73/865.9 |
| 5,533,849 A | 7/1996 | Burdick | |
| 5,535,517 A | 7/1996 | Rode | |
| 5,597,058 A | 1/1997 | Ewer | |
| 5,877,433 A | 3/1999 | Matsuzaki et al. | |
| 5,882,044 A | 3/1999 | Sloane | |
| 6,058,767 A | 5/2000 | Calvin | |
| 6,065,920 A | 5/2000 | Becker et al. | |
| 6,186,032 B1 | 2/2001 | Raines | |
| 6,257,078 B1 * | 7/2001 | Vencill | 73/865.9 |
| 6,286,374 B1 | 9/2001 | Kudo et al. | |
| 6,520,710 B2 | 2/2003 | Wells | |
| 6,598,500 B1 | 7/2003 | Chivington | |
| 6,637,297 B1 | 10/2003 | Mlynarczyk | |
| 6,662,449 B2 * | 12/2003 | Rode | 29/898.09 |
| 6,749,386 B2 | 6/2004 | Harris | |
| 6,857,665 B2 | 2/2005 | Vyse et al. | |
| 6,976,817 B1 | 12/2005 | Grainger | |
| 6,993,852 B2 | 2/2006 | Russell et al. | |
| 7,251,892 B2 * | 8/2007 | Strait | 29/898.09 |
| 7,303,367 B2 | 12/2007 | Rode | |
| 7,343,836 B1 | 3/2008 | Ward | |
| 7,346,985 B1 | 3/2008 | Strait | |
| 7,389,579 B2 | 6/2008 | Rode | |
| 7,428,779 B2 | 9/2008 | Smith et al. | |
| 7,559,135 B2 * | 7/2009 | Rode | 29/724 |
| 2002/0110414 A1 | 8/2002 | Wells | |
| 2003/0035699 A1 | 2/2003 | Harris | |
| 2004/0086354 A1 | 5/2004 | Harris | |
| 2004/0089113 A1 | 5/2004 | Morgan | |
| 2005/0025604 A1 | 2/2005 | Slesinski et al. | |
| 2005/0207865 A1 | 9/2005 | Disantis et al. | |
| 2006/0008340 A1 | 1/2006 | Cox | |
| 2007/0177829 A1 | 8/2007 | Rode | |
| 2007/0211973 A1 | 9/2007 | Rode | |
| 2007/0286699 A1 | 12/2007 | Rode | |
| 2010/0032620 A1 | 2/2010 | Rode | |
| 2010/0326205 A1 * | 12/2010 | Rode | 73/862.23 |
| 2012/0079892 A1 * | 4/2012 | Rode | 73/862.23 |

FOREIGN PATENT DOCUMENTS

| | | |
|---|---|---|
| GB | 2286231 A | 8/1995 |
| GB | 2434621 B | 8/2007 |
| GB | 2435499 B | 8/2007 |

OTHER PUBLICATIONS

Mar. 19, 2007 Examiner's Report in related Application No. AU 2007200331.

"Lock Nut System" Rode, U.S. Appl. No. 11/029,531, filed Jan. 5, 2005. 17 pages.

"STEMCO Pro-Torq Advanced Axle Spindle Nuts 09-571-006", Instruction Guide, Copyright Aug. 2003, 2 pages.

"STEMCO Pro-Torq 571-2970", Copyright 2005, STEMCO LP, 2 pages.

Aug. 25, 2010 GB Intellect Property Office Search Report under Section 17 in related Application No. GB 1008927.4.

"Forming and Shaping Processes Compaction and Sintering (Pulvepresning)", Copyright Institut for Precesteknik Danmarks Tekniske Univeresitet 1996. http://www.ipt.dtu.dk/~ap/ingpro/fprnming/ppm/htm.

"STEMCO, Pro-Torq, An Axle Spindle Nut System for Today's Fleets", Mar. 2003. http://www.stemco.com, pp. 38-41.

"STEMCO, Pro-Torq, An Axle Spindle Nut System for Today's Fleets", Mar. 2003. http://www.stemco.com, pp. 57-64.

"What is Powder Metallurgy?", Dec. 2004, 2 pages. https://www.mpif.org/technology/whatis.html.

Oct. 28, 2008 Office Action in U.S. Appl. No. 11/341,948.

Mar. 11, 2009 Notice of Allowance in U.S. Appl. No. 11/341,948.

Mar. 6, 2009 Notice of Allowance in U.S. Appl. No. 11/354,513.

Oct. 12, 2010 Office Action in U.S. Appl. No. 12/492,826.

Feb. 4, 2011 Office Action in U.S. Appl. No. 12/492,826.

May 20, 2011 Office Action in U.S. Appl. No. 12/492,826.

Sep. 7, 2011 Office Action in U.S. Appl. No. 12/492,826.

Jul. 6, 2011 Office Action in U.S. Appl. No. 13/019,583.

Oct. 28, 2011 Office Action in U.S. Appl. No. 13/019,583.

* cited by examiner

SYSTEMS AND METHODS FOR MEASURING BEARING ENDPLAY

CROSS-REFERENCE TO RELATED APPLICATIONS

This application relates to U.S. application Ser. No. 13/019,583, filed Feb. 2, 2011, titled "Systems and Methods for Adjusting Bearing Endplay", U.S. application Ser. No. 12/951,727, filed Nov. 22, 2010, titled "Systems and Methods for Measuring Bearing Endplay", U.S. application Ser. No. 12/492,826, filed Jun. 26, 2009, titled "Systems And Methods For Preloading A Bearing And Aligning A Lock Nut", U.S. application Ser. No. 11/341,948, filed Jan. 27, 2006, and titled "Method And Apparatus For Preloading A Bearing," published as U.S. Publication No. US2007/0177829A1 on Aug. 2, 2007, U.S. application Ser. No. 11/354,513, filed Feb. 15, 2006, and titled "Method, Apparatus, and Nut for Preloading a Bearing", issued as U.S. Pat. No. 7,389,579 on Jun. 24, 2008, and U.S. Provisional Application No. 61/388,806, filed Oct. 1, 2010, and titled "Systems and Methods for Preloading a Bearing and Aligning Lock Nut", each of which is incorporated herein by reference.

TECHNICAL FIELD

The present invention relates, generally, to methods and apparatus for preloading antifriction bearings in drive trains, particularly, to preloading and adjusting bearings while monitoring the preload being applied.

BACKGROUND OF THE INVENTION

Various means have been devised to simplify the adjustment of axle bearings, specifically, truck axle bearings. It is generally accepted that in some bearing installations, for example, axle bearings, the life of the bearing will be optimized if the adjustment is made for a slight axial compressive deflection, for example, about 0.003 inches (where this amount is the compressive deflection of the two bearings combined), which is often referred to as "a three thousandths preload." Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, such as in a mechanic shop. For example, the assembly of a heavy truck wheel onto a wheel hub assembly is a relatively cumbersome procedure that hinders the mechanic. Moreover, the wheel hub assembly always includes at least one inner seal, usually a lip type of seal, which can impose a resistive drag torque component to the preload torque, particularly when the seal is new.

In one example, a user may tighten a nut holding a bearing on a shaft to a particular torque and then such nut may be loosened to a particular position by referencing an index mark on a face of the nut a particular distance. Such a nut could be turned a particular portion of a rotation by referencing such a marking, e.g., half a turn. Such an adjustment is a particularly inexact procedure given that wheel nut adjustment is desired to have precision of 0.001 of an inch while the degree of rotation of a nut as described is relatively inexact.

Lock nut systems using a single nut are often utilized to retain a wheel or hub assembly, including axle bearings, on a shaft. Such lock nut systems may be connected to a shaft and inhibit rotation of a retaining nut relative to such shafts. For example, such systems are often utilized on motor vehicles, such as axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft.

Thus, a need exists for providing accurate and repeatable procedures and devices for providing and adjusting bearing preload and for adjusting lock nut systems configured to retain preloaded bearings.

SUMMARY OF THE INVENTION

The present provides, in a first aspect, a system for use in measuring an end play of a bearing of a wheel hub assembly which includes a follower configured to extend through an opening in a cover connected to a wheel hub. The cover covers the wheel hub such that the cover inhibits access to an end of a shaft of the wheel hub assembly, and the follower is configured to contact the end through the opening. The follower is received in a holder engageable with the cover such that the follower is movable relative to the cover and the holder to allow the follower to extend from the holder to contact the end of the shaft. A frame has a cavity receiving a measurement probe extending outwardly from the cavity. The probe contacts the follower and is configured to measure movement of the follower relative to the wheel hub to determine endplay of a bearing of the hub assembly on the shaft. The frame includes a plurality of legs extending from the frame to a hub mounted on the shaft and coupled to the bearing to support the frame relative to the hub.

The present invention provides, in a second aspect, a method for determining an endplay of a bearing of a wheel hub assembly mounted on a shaft which includes extending a follower through an opening in a hub cover covering a hub of the wheel hub assembly and extending away from the hub The follower contacts an end of the shaft. A plurality of legs of an endplay measuring apparatus is connected to the hub of the hub assembly mounted on the shaft. A measuring probe is received in a cavity of a frame of the apparatus. The probe contacts the follower. A force is applied to the apparatus to move the hub in a first axial direction until a cessation of movement of the hub. A first measurement of the probe is determined. A force is applied on the apparatus in a second axial direction opposite to the first axial direction until a second cessation of movement of the hub. A second measurement of the probe is determined after the second cessation of movement. A movement of the follower by the probe is determined to determine an endplay of the bearing by comparing the first measurement to the second measurement.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

In accordance with the principals of the present invention, systems and methods for adjusting bearings mounted on a shaft are provided. In an exemplary embodiment depicted in FIG. 1, a system 10 for measuring end play is mounted on a wheel hub assembly 20.

Wheel hub assembly 20 is an assembly that would typically be found on a front or rear axle of a cab or tractor of a tractor-trailer, or an axle of a trailer. However, aspects of the invention are not limited to use for vehicle bearings. As will generally be understood by those skilled in the art, aspects of the invention may be used to service bearings and bearing assemblies in any machine or device that employs bearings, including, but not limited to: power trains, transmissions, machine components, on and off-road vehicles, aircraft wheels, marine drives, spacecraft, conveyor rolls, and windmills, among others. According to aspects of the present invention, system 10 may be used in these and any other assembly for which bearing preload and/or endplay is desired, for example, any assembly that utilizes thrust and radial load carrying bearings that are indirectly mounted.

Figure 1:
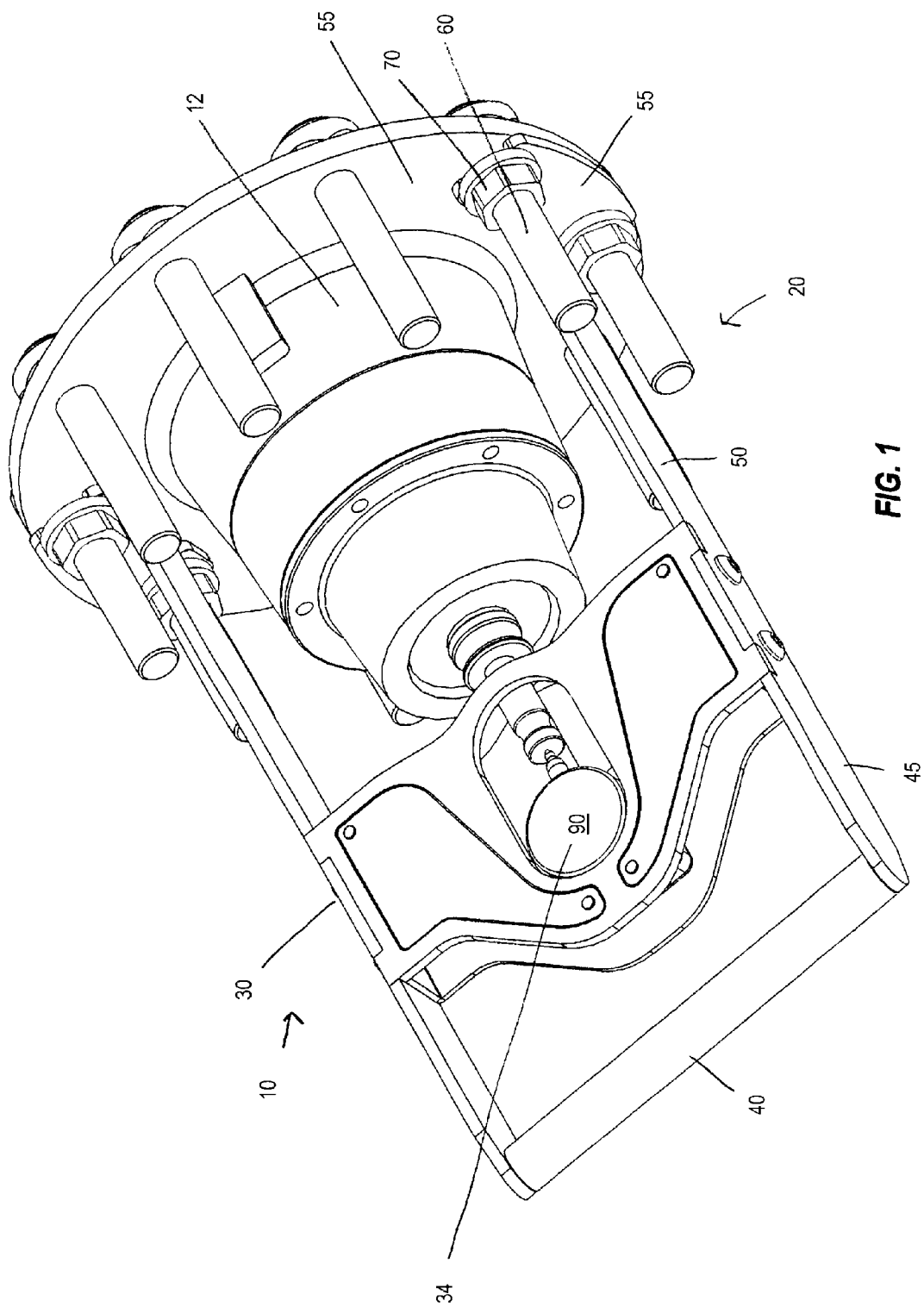
FIG. 1 is a perspective view of a system for measuring endplay on a bearing of a wheel hub assembly mounted on a shaft in accordance with the present invention.
Figure 2:
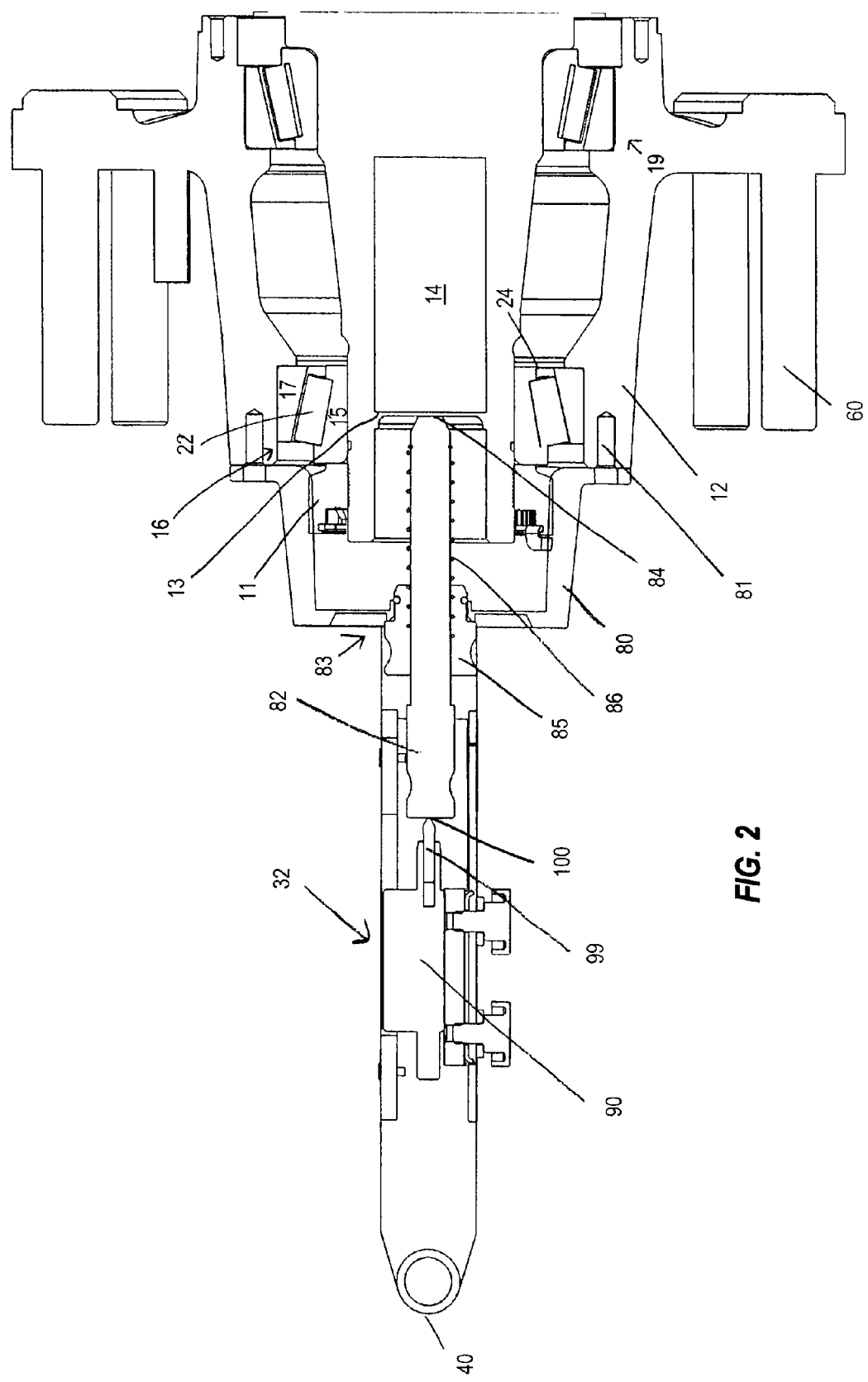
FIG. 2 is a side cross-sectional view of the system of FIG. 1.

As shown in FIGS. 1-2, for example, wheel hub assembly 20 includes a wheel hub or, simply, a hub 12, a threaded, spindle, axle, or a shaft 14. As is typical, shaft 14 is mounted on two antifriction bearings and shaft 14 includes an exposed end 13, which is typically threaded on the outside diameter and is partially hollow at the end. A retaining nut 11 (FIG. 2) may be threaded to exposed end 13 to retain hub 12 thereon.

As shown in FIG. 2, as is typical of bearings, outboard bearing 16 includes an inner race (or cone) 15, an outer race (or cup) 17, a plurality of rollers 22, and a roller cage 24. Similarly, an inboard bearing 19 includes an inner race (or cone) (not shown), an outer race (or cup) (not shown), a plurality of rollers (not shown), and roller cage (not shown). The details of an inboard bearing and an outboard bearing are described and depicted in co-owned U.S. Pat. No. 7,303,367, issued Dec. 4, 2007 (application Ser. No. 11/029,531 filed Jan. 5, 2005), entitled "Lock Nut System"; U.S. Publication No. 2007/0177829A1, published Aug. 2, 2007, (application Ser. No. 11/341,948 filed Jan. 27, 2006), entitled "Method and Apparatus for Preloading a Bearing"; and U.S. Pat. No. 7,389,579, issued Jun. 24, 2008 (application Ser. No. 11/354, 513, filed Feb. 15, 2006), entitled "Method, Apparatus, and Nut for Preloading a Bearing", the entirety of which are incorporated herein by reference.

As depicted in FIGS. 5-8 of co-owned U.S. Provisional Application No. 61/388,806, filed Oct. 1, 2010, entitled "Systems and Methods for Preloading a Bearing and Aligning Lock Nut", for example, retaining nut 11 may be a locking nut as disclosed in co-owned U.S. Pat. No. 7,303,367 (application Ser. No. 11/029,531 filed Jan. 5, 2005), entitled "Lock Nut System"; U.S. Publication No. 2007/0177829A1 (application Ser. No. 11/341,948 filed Jan. 27, 2006), entitled "Method and Apparatus for Preloading a Bearing"; and U.S. Pat. No. 7,389,579 (application Ser. No. 11/354,513, filed Feb. 15, 2006), entitled "Method, Apparatus, and Nut for Preloading a Bearing". In another example, a retaining nut could be a locking nut as disclosed in U.S. Pat. No. 3,762,455 to Anderson Jr. In the conventional art, retaining nut 11 typically is used to secure a wheel (e.g., wheel 200, FIG. 3) or hub assembly to non-rotating axle or spindle 14. However, in aspects of the present invention, retaining nut 11 may be useful in varying the preload and/or endplay of bearing 16. Bearing 16 may be a tapered roller bearing, or aspects of the invention may be applied to other types of antifriction bearings for which it is desirable to provide preload and/or endplay, for example, spherical roller bearings, deep groove ball bearings, and the like.

As described above, it is desirable for a adjustment to be provided to a bearing assembly such that a desired amount of endplay is present. After retaining nut 11 is tightened on the shaft to a particular predetermined torque (e.g., using a torque wrench), the standard procedures call for a loosening of say ¼ turn to create a desirable endplay of bearing 16 on shaft 14. All typical adjustment procedures require that said endplay be measured with a dial indicator to assure a safe adjustment had been achieved.

System 10 may include a frame 30 formed of a plurality of cross members 35. Frame 30 may be connected to a handle 40 at one end of system 10 by connecting legs 45. Frame 30 may also be connected to pressing legs 50 which may extend from frame 30 away from handle 40 and to wheel hub 12 as depicted in the figures. Pressing legs 50 may be connected to wheel hub 12 at wheel lugs 60. Connecting tabs 55 may be connected to, or monolithic relative to, pressing legs 50 and may be aligned in a direction substantially perpendicular to pressing legs 50, such that connecting tabs 55 may be received under lug nuts 70 threaded onto wheel lugs 60. Pressing legs 50 may be substantially parallel to each other and may be connected to wheel hub 12 such that the legs are substantially parallel to the axis (i.e., longitudinal axis) of shaft 14. Connecting legs 45 may also be substantially parallel to the axis of shaft 14. Each connecting leg and pressing leg on a same side of frame 30 may be monolithic to, or connected to, one another. The cross members (i.e., cross members 35) may be connected on each side thereof to at least one of pressing legs 50 and connecting legs 45.

A hubcap 80 may be connected to hub 12 via screws 81 or other connecting mechanisms as is known in the art. A follower 82 may be received in a holder 85 which is received in an opening 83 through hubcap 80 such that holder 85 is connected to, or contacts, hubcap 80 to inhibit movement of holder 85 through opening 83 toward shaft 14. A resilient member 86 (e.g., a spring) may be connected to follower 82 and holder 85 such that a distal end 84 of follower 82 is biased toward shaft 14 and away from probe 90. As used herein, follower refers to any structure, or part of a structure, which contacts shaft 14 and extends to holder 85 such that the follower extends through the holder toward handle 40. A dial indicator or probe 90 may be received in a cavity 95 of frame 30 such that probe 90 is stationary relative to frame 30 and a remainder of system 10. For example, probe 90 may be connected to cross members 35 in any number of ways, such as by welding or by mechanical fasteners. Frame 30 may include an opening 32 to allow user to view a display 34 of a dial indicator of probe 90.

A probe tip 100 of a probe stem 99 may contact follower 82 when follower 82 is received in holder 85 such that end 83 of follower 82 contacts shaft 14. Probe tip 100 may be aligned in a direction substantially parallel to an axis of shaft 14. For example, an axis of probe tip 100 may be substantially aligned with the longitudinal axis of shaft 14.

When a measurement of endplay of hub assembly 20, including wheel hub 12 and bearing 16, is desired, a user may grasp handle 40 and push in a first direction toward hub 12 until no further forward motion occurs. Probe 90 may then be reset to a known setting (e.g., 'zeroed') to allow a measurement by probe 90 which it is in contact with follower 82. The user may then pull in a second direction on handle 40 until no further reverse motion of hub 12 occurs. The user may then view display 34 to determine a measurement of the movement of hub 12 relative to the follower as determined by the movement of probe 90 which is in contact with the face of the follower. The movement by the probe signals a distance on the display which indicates the endplay of wheel hub 12 and bearing 16. The difference between a movement after forward motion of the hub ceases to that after reverse motion of the hub ceases provides an indication of the endplay of bearing 16. The components of system 10 (e.g., the connecting legs, extending legs, handle, tabs, and frame) may be sufficiently rigid to allow the application of a force (e.g., in a forward and reverse axial direction relative to shaft 14) to handle 40 to transfer such force to hub 12 to allow the motion of hub 12 in a forward and reverse direction to allow the measurement of the endplay as described.

Further, as described above probe 90 is connected to frame 30. The connection of probe 90 to frame 30 may be fixed as described above or could be adjustable. For example, probe 90 may be connected to a plate 33 which has screws or other connectors received in slots of frame 35 such that probe 90 may be adjusted to a particular position and tightened by the screws or fasteners to frame 35 if further adjustment is desired.

After the measurement of endplay described above (or prior thereto) it may be desirable to tighten nut 11 to adjust such endplay. As depicted in FIG. 1, openings 52 may be present between connecting legs 50 on opposite sides of system 10. A user may insert a wrench (not shown) into one of openings 52 to engage the wrench with a nut 11 to adjust an endplay of bearing 16 and hub 12. Prior to any such adjustment, however, hubcap 80 is removed to allow access of a wrench to nut 11.

Figure 3:
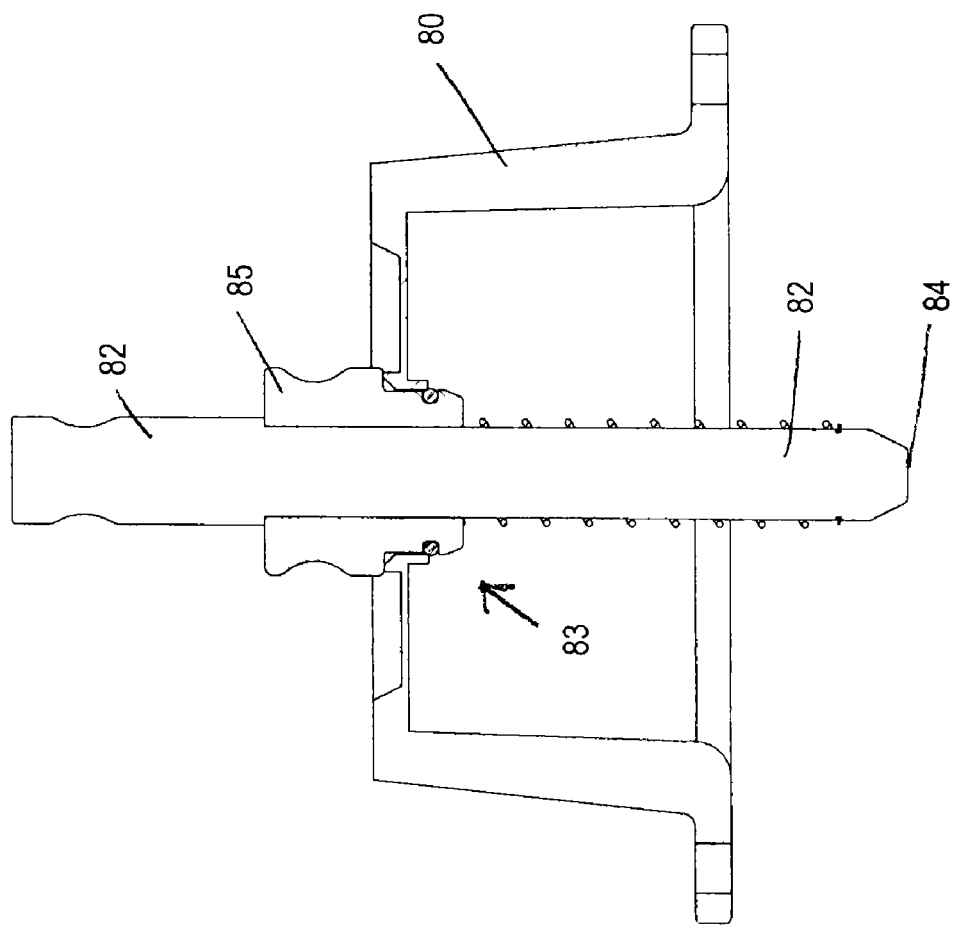
FIG. 3 is a side cross-sectional view of the follower, holder and hub cover of FIG. 1.
Figure 4:
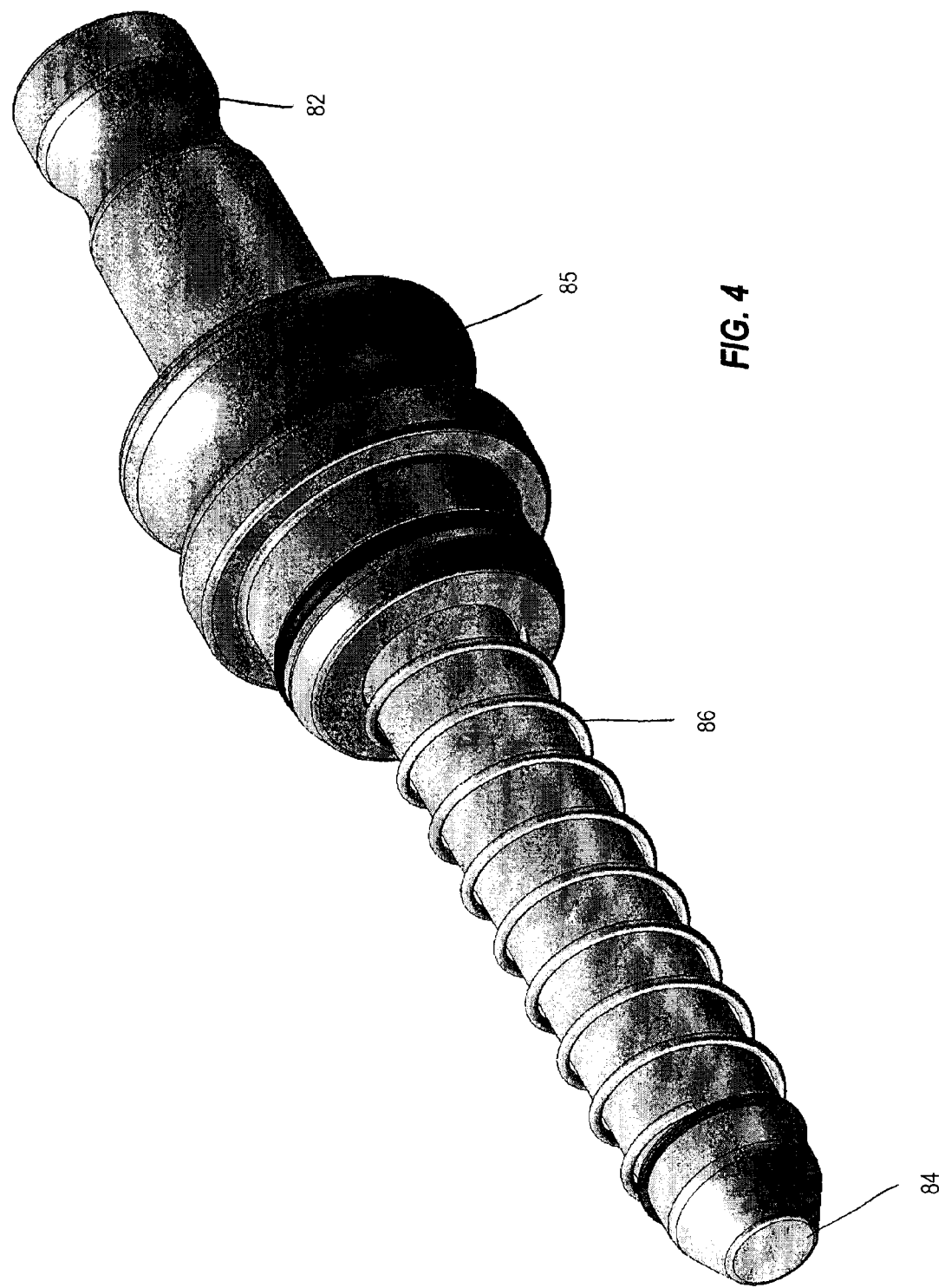
FIG. 4 is a perspective view of the follower and holder of FIG. 1.

As described above and depicted in FIG. 1, endplay may be measured by system 10 with tabs 55 placed on wheel hub 12 and held in place by wheel lugs 60. In another example, tabs 55 could be received on top of wheel 200 connected to hub 12 as depicted in FIG. 3 of coowned U.S. application Ser. No. 12/951,727. In a further unillustrated example, follower 80 could be replaced by a follower of a different axial dimension or thickness to accommodate a height of hubcap from a hub or a dimension of a opening (e.g., opening 83) through a hubcap (e.g., hubcap 80), or another structure mounted on hub 12 which restricts access to shaft 14 by a system for measuring end play (e.g., system 10). As described above, handle 40 may be grasped by a user and a force may be applied thereto to move bearing 16 and hub 12 to a first position followed by a "zeroing" of the probe and then movement to a second position. During the application of force to the first position and movement from the first position to the second position, handle 40 may be utilized to rotate system 10 and thus hub 12 and bearing 16. This rotation insures roller alignment of the bearing such that the measured endplay is accurate for the circumference of hub 12 and bearing 16. Also, pressing legs 55 are located on opposite sides of system 10 and are located about 180° apart relative to the axis of shaft 14. The positioning of such pressing legs substantially equally distant from one another and connected to handle 40 via connecting legs 45 promotes an equidistant application of force to hub 12 and bearing 16 when a force is applied to handle 40 described above such that twisting of the hub is minimized and an accurate measurement of endplay may be achieved and an off-center loading of the bearing may be avoided. Handle 40 may also extend substantially perpendicularly relative to the axis of shaft 14 and may extend through the axis to opposite sides of such axis as depicted in the figures. In particular, handle 40 may connect to connecting legs 45, and connecting legs 45 may extend substantially parallel to the axis of shaft 45 and pressing legs 50 may also extend substantially parallel to the axis of shaft 45 such that connecting legs 50 may contact hub 12. As described above, pressing legs 50 may connect to tabs 55 which extend substantially perpendicularly to pressing legs 50. It will be understood by one skilled in the art that pressing legs 50 could connect to hub 12 in any number of other ways while satisfying the objectives of the invention.

Although aspects of the present invention were described above with respect to their application to wheel hub assemblies, for example, truck wheel hub assemblies, it is understood that aspects of the present invention may be applied to any vehicle, machine, or component having at least one bearing.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A system for use in measuring an endplay of a bearing of a wheel hub assembly, the system comprising:
    a follower configured to extend through an opening in a cover connected to a wheel hub, the cover covering the wheel hub such that the cover inhibits access to an end of a shaft of the wheel hub assembly, said follower configured to contact said end through said opening;
    said follower received in a holder engageable with the cover such that said follower is movable relative to said cover and said holder to allow said follower to extend from said holder to contact the end of the shaft;
    a frame having a measurement probe attached thereto, said probe configured to contact said follower and measure relative movement of said follower to determine an endplay of a bearing of the hub assembly on the shaft; said frame comprising a plurality of legs extending from said frame to a hub of the hub assembly mounted on said shaft and coupled to said bearing to support said frame relative to the hub; and
    a handle connected to said frame, said frame, said plurality of legs and said handle sufficiently rigid to allow a user to apply a force to said handle to move the hub in an axial direction relative to the shaft until a cessation of movement of the hub relative to the shaft.

2. The system of claim 1 further comprising a handle connected to said frame, said handle extending substantially perpendicularly relative to an axis of the shaft and extending to opposite sides of the axis.

3. The system of claim 2 wherein said handle extends a substantially equal distance on each side of the axis of the shaft.

4. The system of claim 2 wherein said handle is connected to said frame by a plurality of connecting legs, said handle located on an opposite side of said frame relative to said follower.

5. The system of claim 1 wherein said cover comprises a hubcap.

6. The system of claim 1 wherein said frame is spaced from said follower when said follower contacts the shaft to allow said frame to move toward and away from said follower and to allow said probe to measure movement of said frame relative to said follower.

7. The system of claim 1 further comprising a resilient member engaging said follower and said holder to bias a distal end of said follower away from said probe.

8. The system of claim 1 further comprising a resilient member engaging said follower and said holder to bias a distal end of said follower toward the shaft.

9. The system of claim 1 further comprising a spring engaging said follower and said holder to bias a distal end of said follower toward the shaft.

10. The system of claim 1 wherein said probe and said follower are axially aligned with an axis of the shaft.

11. The system of claim 1 further comprising an opening between two legs of said plurality of legs to allow a user to insert a tool into the opening such that the tool engages a nut holding said hub assembly on the shaft when the cover is separated from the hub.

12. The system of claim 1 wherein said plurality of legs is connectable to a plurality of wheel lugs of a wheel hub of the wheel hub assembly mounted on the shaft.

13. A method for determining an endplay of a bearing of a wheel hub assembly mounted on a shaft, the method comprising;
extending a follower through an opening in a hub cover covering a hub of the wheel hub assembly and extending away from the hub, the follower contacting an end of the shaft;
connecting a plurality of legs of an endplay measuring apparatus to a hub of the hub assembly mounted on the shaft;
connecting a measurement probe to a frame of the apparatus;
the probe contacting the follower;
applying a force to the apparatus to move the hub in a first axial direction until a cessation of movement of the hub, determining a first measurement of the probe;
applying a force to the apparatus in a second axial direction opposite to the first axial direction until a second cessation of movement of the hub;
determining a second measurement of the probe after the second cessation of movement; and
determining a movement of the follower by the probe to determine an endplay of the bearing by comparing the first measurement to the second measurement.

14. The method of claim 13 further comprising extending a handle of the apparatus substantially perpendicularly relative to an axis of the shaft and extending to opposite sides of the axis.

15. The method of claim 13 further comprising receiving the follower in a holder engaging the hub cover such that the follower is movable relative to the cover and the holder to allow the follower to extend from the holder to contact the end of the shaft.

16. The method of claim 13 wherein the applying the force to the apparatus comprises applying the force to a handle of the apparatus connected to the frame and the plurality of legs to move the hub in a first axial direction until the cessation of movement of the hub.

17. The method of claim 13 further comprising turning the hub while the device is mounted to the hub to analyze roller alignment of the bearing.

18. The method of claim 13 further comprising removing the hub cover from the hub and using a wrench to adjust a tightness of a nut holding the hub assembly by extending the wrench through an opening between two legs of the plurality of legs.

19. The method of claim 13 further comprising a resilient member engaging the follower and the holder to bias a distal end of the follower away from the probe.

20. The method of claim 13 further comprising a resilient member engaging the follower and the holder to bias a distal end of the follower toward the shaft.

21. The method of claim 13 further comprising a spring engaging the follower and the holder to bias a distal end of the follower toward the shaft.

22. A system for use in measuring an endplay of a bearing of a wheel hub assembly, the system comprising:
a follower configured to extend through an opening in a cover connected to a wheel hub, the cover covering the wheel hub such that the cover inhibits access to an end of a shaft of the wheel hub assembly, said follower configured to contact said end through said opening;
said follower received in a holder engageable with the cover such that said follower is movable relative to said cover and said holder to allow said follower to extend from said holder to contact the end of the shaft;
a frame having a measurement probe attached thereto, said probe configured to contact said follower and measure relative movement of said follower to determine an endplay of a bearing of the hub assembly on the shaft; said frame comprising a plurality of legs extending from said frame to a hub of the hub assembly mounted on said shaft and coupled to said bearing to support said frame relative to the hub; and
wherein said frame is spaced from said follower when said follower contacts the shaft to allow said frame to move toward and away from said follower and to allow said probe to measure movement of said frame relative to said follower.

23. A system for use in measuring an endplay of a bearing of a wheel hub assembly, the system comprising:
a follower configured to extend through an opening in a cover connected to a wheel hub, the cover covering the wheel hub such that the cover inhibits access to an end of a shaft of the wheel hub assembly, said follower configured to contact said end through said opening;
said follower received in a holder engageable with the cover such that said follower is movable relative to said cover and said holder to allow said follower to extend from said holder to contact the end of the shaft;
a frame having a measurement probe attached thereto, said probe configured to contact said follower and measure relative movement of said follower to determine an endplay of a bearing of the hub assembly on the shaft; said frame comprising a plurality of legs extending from said frame to a hub of the hub assembly mounted on said shaft and coupled to said bearing to support said frame relative to the hub; and
a handle connected to said frame, said handle extending substantially perpendicularly relative to an axis of the shaft and extending to opposite sides of the axis, said handle connected to said frame by a plurality of connecting legs, said handle located on an opposite side of said frame relative to said follower.

* * * * *